(12) United States Patent
Won et al.

(10) Patent No.: US 9,658,481 B2
(45) Date of Patent: May 23, 2017

(54) DISPLAY DEVICE COMPRISING A MICROCAVITY WHEREIN A POLARIZER, A PIXEL ELECTRODE, A COMMON ELECTRODE, A ROOF LAYER, AND A LIQUID CRYSTAL LAYER ARE NOT DISPOSED IN A TRANSPARENT REGION

(71) Applicant: Samsung Display Co., Ltd., Yongin, Gyeonggi-Do (KR)

(72) Inventors: Byeong-Hee Won, Hwaseong-si (KR); Hae Ju Yun, Hwaseong-si (KR); Ha-Yun Kang, Asan-si (KR)

(73) Assignee: Samsung Display Co., Ltd. (KR)

( * ) Notice: Subject to any disclaimer, the term of this patent is extended or adjusted under 35 U.S.C. 154(b) by 105 days.

(21) Appl. No.: 14/109,746

(22) Filed: Dec. 17, 2013

(65) Prior Publication Data

US 2015/0042928 A1 Feb. 12, 2015

(30) Foreign Application Priority Data

Aug. 9, 2013 (KR) .......................... 10-2013-0094905

(51) Int. Cl.
*G02F 1/1333* (2006.01)
*G02F 1/1343* (2006.01)
*G02F 1/1335* (2006.01)

(52) U.S. Cl.
CPC .. *G02F 1/133377* (2013.01); *G02F 1/133528* (2013.01); *G02F 2001/134318* (2013.01)

(58) Field of Classification Search
CPC ......... G02F 1/133345; G02F 1/133377; G02F 1/1362
See application file for complete search history.

(56) References Cited

U.S. PATENT DOCUMENTS 7,339,642 B2  3/2008  Iijima et al.
2011/0001905 A1*  1/2011  Tanaka ................ G02F 1/13439
349/96

(Continued)

FOREIGN PATENT DOCUMENTS

JP  11-258578  9/1999
JP  2005-025003  1/2005

(Continued)

*Primary Examiner* — Paul Lee
(74) *Attorney, Agent, or Firm* — Innovation Counsel LLP

(57) ABSTRACT

The present invention relates to a display device with improved transparency and appearance, and the display device according to an example embodiment of the present invention includes: a substrate including a plurality of pixel areas having a transparent region and a liquid crystal driving region; a thin film transistor formed on the substrate; a pixel electrode connected to the thin film transistor; a common electrode formed in the liquid crystal driving region on the pixel electrode so as to be spaced apart from the pixel electrode with a microcavity therebetween; a roof layer formed on the common electrode; an injection hole formed in the common electrode and the roof layer so as to expose the microcavity; a liquid crystal layer filling the microcavity; and an overcoat formed on the roof layer so as to cover the liquid crystal injection hole to seal the microcavity, wherein the pixel electrode, the common electrode, the roof layer, and the liquid crystal layer are formed in the liquid crystal driving region.

18 Claims, 8 Drawing Sheets

(56) References Cited

U.S. PATENT DOCUMENTS

| | | | |
|---|---|---|---|
| 2011/0164210 A1* | 7/2011 | Tsuda | H01L 51/5281 349/96 |
| 2012/0062448 A1* | 3/2012 | Kim | G02F 1/133377 345/55 |
| 2012/0113363 A1 | 5/2012 | Lim et al. | |

FOREIGN PATENT DOCUMENTS

| | | |
|---|---|---|
| JP | 3648936 | 2/2005 |
| KR | 10-0878203 B1 | 1/2009 |
| KR | 10-2011-0074257 A | 6/2011 |
| KR | 1020130112285 A | 10/2013 |

* cited by examiner

DISPLAY DEVICE COMPRISING A MICROCAVITY WHEREIN A POLARIZER, A PIXEL ELECTRODE, A COMMON ELECTRODE, A ROOF LAYER, AND A LIQUID CRYSTAL LAYER ARE NOT DISPOSED IN A TRANSPARENT REGION

CROSS-REFERENCE TO RELATED APPLICATION

This application claims priority to and the benefit of Korean Patent Application No. 10-2013-0094905 filed in the Korean Intellectual Property Office on Aug. 9, 2013, the entire contents of which are incorporated herein by reference.

BACKGROUND (a) Technical Field

The present invention relates to a display device. More particularly, the present invention relates to a display device with improved transparency and appearance.

(b) Description of the Related Art

A liquid crystal display (hereinafter referred to as an LCD) is one of the most widely used flat panel displays. An LCD includes two display panels provided with electric field generating electrodes, such as pixel electrodes and a common electrode, and a liquid crystal layer interposed between the two display panels. In an LCD, voltages are applied to the electric field generating electrodes to generate an electric field in the liquid crystal layer. Due to the generated electric field, liquid crystal molecules of the liquid crystal layer are aligned, and polarization of incident light is controlled, thereby displaying images.

The two sheets of display panels configuring the liquid crystal display may include a thin film transistor array panel and an opposing display panel. In the thin film transistor array panel, a gate line transferring a gate signal and a data line transferring a data signal are formed so as to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two sheets of substrates are necessarily used, and respective constituent elements are formed on the two sheets of substrates, and as a result, there are problems in that the display device is heavy and thick, has a high cost, and has a long processing time.

Additionally, efforts are being made to realize a transparent display device.

The above information disclosed in this Background section is only for enhancement of understanding of the background of the disclosure and therefore it may contain information that does not form the prior art that is already known to a person of ordinary skill in the art.

SUMMARY

A display device with reduced weight, thickness, cost, and process time by manufacturing the display device with one substrate is provided.

Also, a display device with improved transparency and appearance by forming a transparent region without a liquid crystal layer is provided.

A display device according includes: a substrate including a plurality of pixel areas having a transparent region and a liquid crystal driving region; a thin film transistor formed on the substrate; a pixel electrode connected to the thin film transistor; a common electrode formed in the liquid crystal driving region on the pixel electrode so as to be spaced apart from the pixel electrode with a microcavity therebetween; a roof layer formed on the common electrode; an injection hole formed in the common electrode and the roof layer so as to expose the microcavity; a liquid crystal layer filling the microcavity; and an overcoat formed on the roof layer so as to cover the liquid crystal injection hole to seal the microcavity, wherein the pixel electrode, the common electrode, the roof layer, and the liquid crystal layer are formed in the liquid crystal driving region.

The pixel electrode, the common electrode, the roof layer, and the liquid crystal layer may not be formed in the transparent region.

The display device may further include a color filter formed in the liquid crystal driving region.

The display device may further include a light blocking member formed along an outer edge of the liquid crystal driving region.

The color filter and the light blocking member may not be formed in the transparent region.

The transparent region may be formed at 10% to 50% of the pixel area.

The display device may further include a first polarizer formed under the substrate, and a second polarizer formed on the overcoat.

The transmissive axis of the first polarizer and the transmissive axis of the second polarizer may be parallel.

The transmissive axis of the first polarizer and the transmissive axis of the second polarizer may be crossed.

The first polarizer may be a metal wire grid polarizer.

The first polarizer may be formed in the liquid crystal driving region.

The second polarizer may be a metal wire grid polarizer.

The second polarizer may be formed in the liquid crystal driving region.

A plurality of pixel areas may be disposed in a matrix shape, and the transparent region and the liquid crystal driving region may be disposed to be adjacent in a column direction.

The transparent regions of pixel areas adjacent in a column direction may be disposed to be adjacent.

The liquid crystal driving region may be disposed at an upper side and the transparent region may be disposed at a lower side in a pixel area of an odd-numbered row, and the transparent region may be disposed at the upper side and the liquid crystal driving region may be disposed at the lower side in a pixel area of an even-numbered row.

The display device may further include a plurality of gate lines and a plurality of data lines that cross the gate lines, and the pixel area may be defined as a region between two adjacent gate lines and two adjacent data lines.

The liquid crystal layer may not be formed in the transparent region

The display device according to the example embodiments has effects as below.

The display device according to an example embodiment may have reduced weight, thickness, cost, and process time by manufacturing the display device using one substrate.

Also, by forming the transparent region without the liquid crystal layer, transparency and appearance of the display device may be improved.

DETAILED DESCRIPTION OF THE EMBODIMENTS

Figure 1:
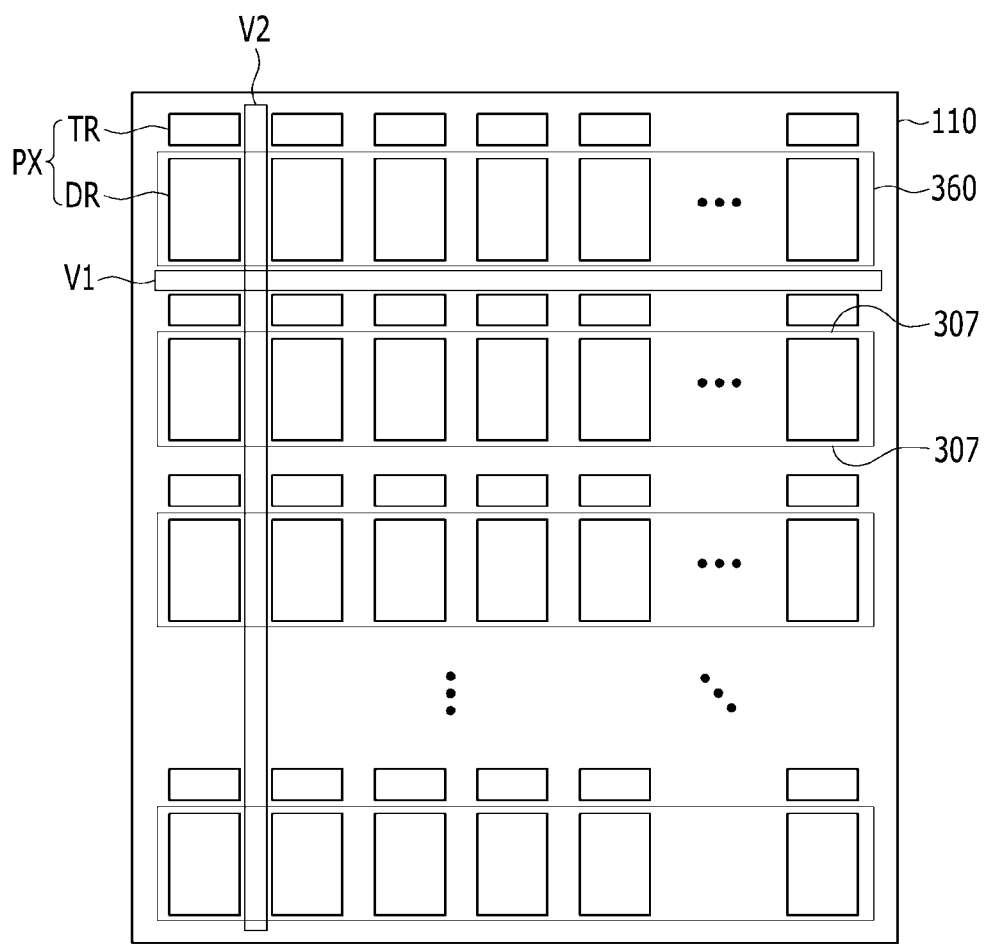
FIG. 1 is a top plan view of a display device according to an example embodiment.

Example embodiments will be described more fully hereinafter with reference to the accompanying drawings, in which example embodiments are shown. As those of ordinary skill in the relevant art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

In a conventional liquid crystal display, to realize a transparent display device, a transparent region is formed in a partial region of the pixel area in which there is no color filter. However, the liquid crystal layer is formed in the transparent region of the pixel area, such that there is a limit to increasing the transparency.

Referring to FIG. 1, a display device according to an example embodiment will be schematically described.

FIG. 1 is a top plan view of a display device according to an example embodiment, and for convenience, FIG. 1 only shows some constituent elements.

A display device according to an example embodiment includes a substrate 110 made of a material such as glass or plastic, and a roof layer 360 formed on the substrate 110.

The substrate 110 includes a plurality of pixel areas PX. The plurality of pixel areas PX are disposed in a matrix form which includes a plurality of pixel rows and a plurality of pixel columns. Each pixel area PX may include a transparent region TR and a liquid crystal driving region DR. The transparent region TR and the liquid crystal driving region DR may be disposed to be adjacent to each other along a column direction.

A first valley V1 is positioned between the pixel areas PX adjacent to each other along the column direction, and a second valley V2 is positioned between the pixel areas PX adjacent to each other along the row direction. That is, the first valley V1 is positioned in the row direction between a plurality of pixel rows, and the second valley V2 is positioned in the column direction between a plurality of pixel columns.

The roof layer 360 is formed at the liquid crystal driving region DR. The roof layer 360 may be formed to be connected in the row direction. That is, the roof layer 360 may be formed at the second valley V2 positioned between the liquid crystal driving regions DR of adjacent pixels PX. The roof layer 360 is not formed at the first valley V1 and the transparent region TR, and an injection hole (not shown) may be formed so that the constituent elements positioned under the roof layer 360 may be exposed at edges of upper and lower sides of the liquid crystal driving region DR.

By forming each roof layer 360 to be separated from the substrate 110 between the adjacent second valleys V2, a microcavity (not shown) is formed at the liquid crystal driving region DR. By forming each roof layer 360 to be attached to the substrate 110 in the second valley V2, both side surfaces of the microcavity are covered.

A liquid crystal layer (not shown) is formed in the microcavity. The microcavity is formed at the liquid crystal driving region DR such that the liquid crystal layer is positioned in the liquid crystal driving region DR. That is, the liquid crystal layer is not formed at the transparent region TR. In an example embodiment, by forming the transparent region TR where the liquid crystal layer does not exist, the transparency and the appearance of the transparent display device may be further improved compared with a case in which the liquid crystal layer is formed in the entre pixel area PX.

The structure of the display device according to an example embodiment is only an example, and numerous variations may be possible. For example, an arrangement of the pixel area PX, the first valley V1, and the second valley V2 may be changed, a plurality of roof layers 360 may be connected to each other in the first valley V1, and a portion of each roof layer 360 may be formed to be separate from the substrate 110 in the second valley V2 such that adjacent microcavities 305 (see FIG. 3) may be connected to each other.

An individual pixel of the display device according to an example embodiment will be described with reference to FIG. 1 to FIG. 4.

Figure 2:
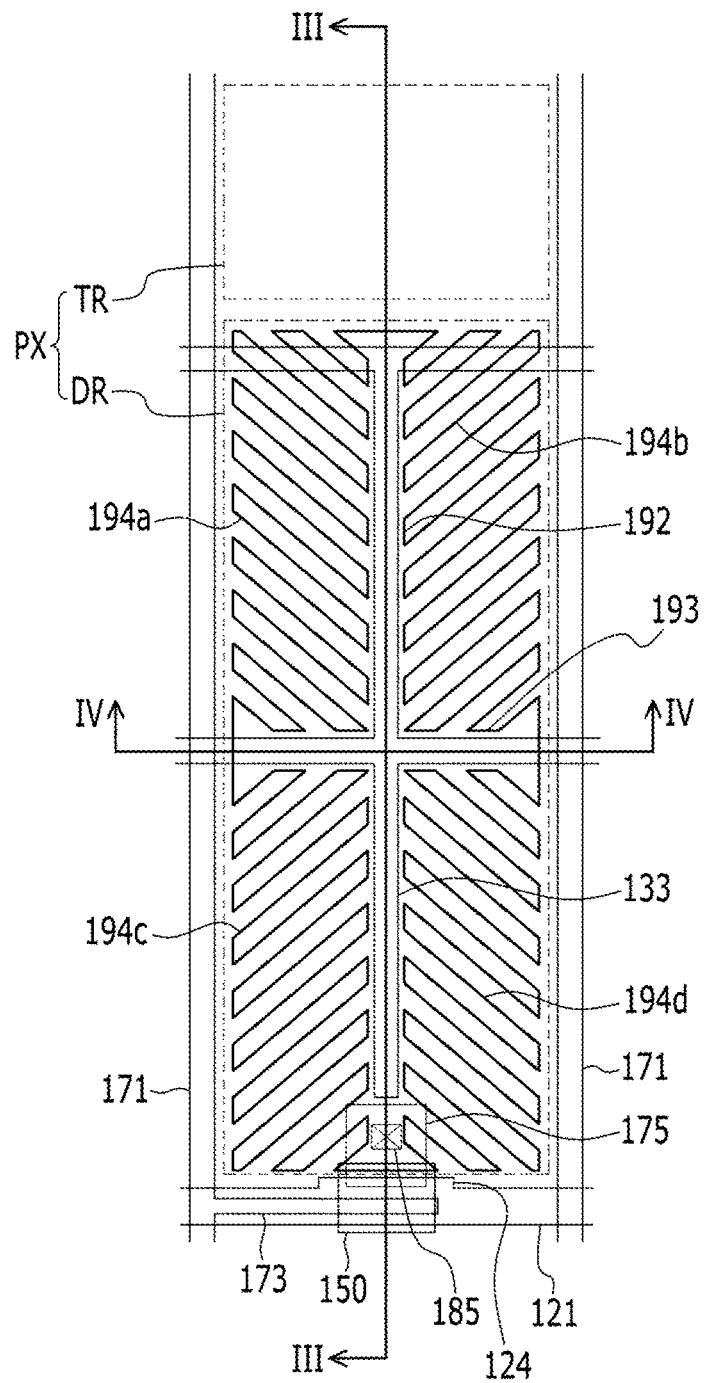
FIG. 2 is a top plan view of one pixel of a display device according to an example embodiment.
Figure 3:
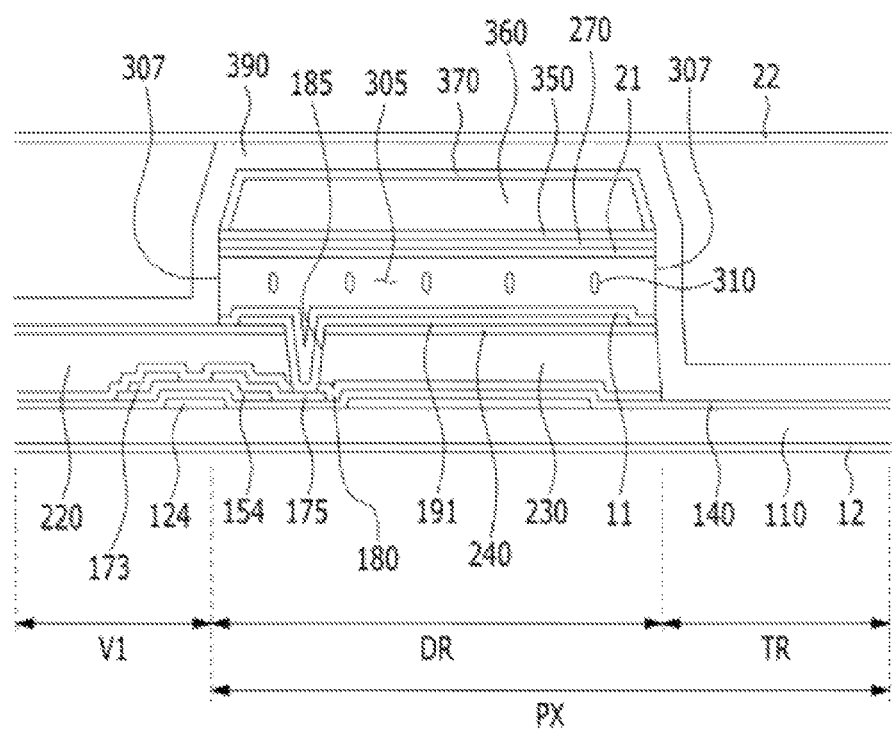
FIG. 3 is a partial cross-sectional view of a display device according to an example embodiment taken along the line III-III of FIG. 2.
Figure 4:
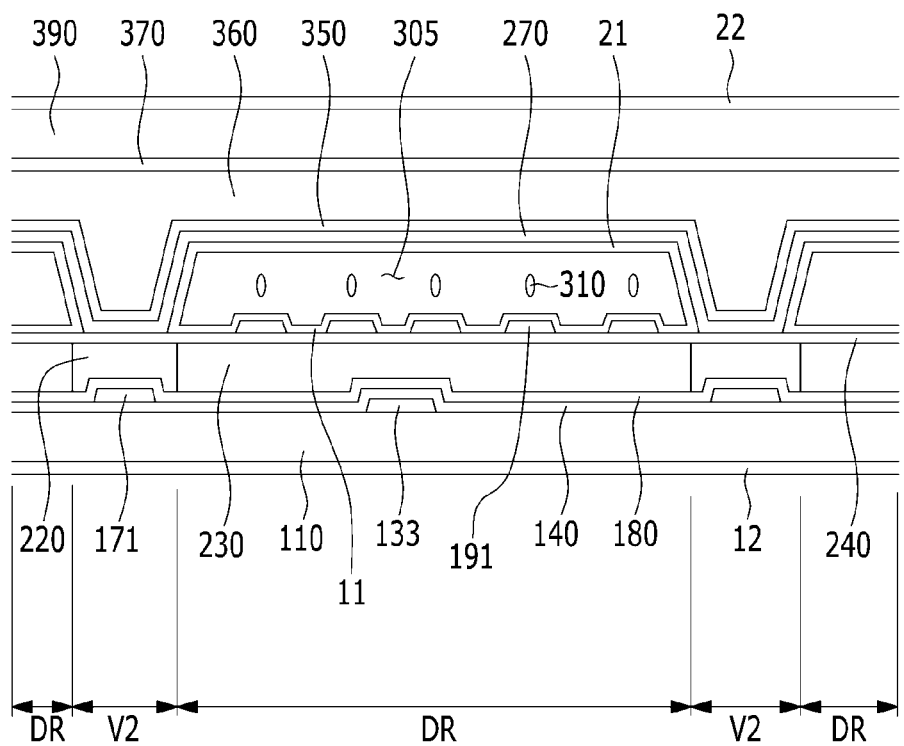
FIG. 4 is a partial cross-sectional view of a display device according to an example embodiment taken along the line IV-IV of FIG. 2.

FIG. 2 is a top plan view of one pixel of a display device according to an example embodiment, FIG. 3 is a partial cross-sectional view of a display device according to an example embodiment taken along the line III-III of FIG. 2, and FIG. 4 is a partial cross-sectional view of a display device according to an example embodiment taken along the line IV-IV of FIG. 2.

A gate line 121 is formed in one direction and a data line 171 is formed in another direction on the substrate 110. The gate line 121 may be formed at the first valley V1 and the data line 171 may be formed at the second valley V2. The gate line 121 and the data line 171 may be formed to be crossed. The pixel area PX of the substrate 110 may be defined by the gate line 121 and the data line 171 that cross each other.

The gate line 121 mainly extends in a horizontal direction, and a gate signal is transferred therethrough. Further, a gate electrode 124 is formed to protrude from the gate line 121. A gate signal is applied to the gate electrode 124 through the gate line 121.

A storage electrode 133 not connected to the gate line 121 and the gate electrode 124 may be further formed in the pixel area PX. As shown in the drawings, the storage electrode 133 may be formed with portions that are parallel to both the gate line 121 and the data line 171. Alternatively, the storage electrode 133 may only be formed parallel to the gate line 121. A plurality of storage electrodes 133 formed in the pixel areas PX adjacent to each other are connected. The storage electrode 133 is applied with a predetermined voltage such as a common voltage.

A gate insulating layer 140 is formed on the gate line 121, the gate electrode 124, and the storage electrode 133. The gate insulating layer 140 may be made of an inorganic insulating material such as, for example, a silicon nitride (SiNx) and a silicon oxide (SiOx). Further, the gate insulating layer 140 may be formed of a single layer or multiple layers.

A semiconductor layer 154 is formed on the gate insulating layer 140. The semiconductor layer 154 may be positioned on the gate electrode 124. Also, although not shown, the semiconductor layer 154 may be formed to extend under the data line 171. The semiconductor layer 154 may be made, for example, of amorphous silicon, polycrystalline silicon, or a metal oxide.

A source electrode 173 protruding from the data line 171 and a drain electrode 175 separated from the source electrode 173 are formed on the semiconductor layer 154.

The data line 171 mainly extends in the vertical direction and transmits a data signal. The data signal transmitted by the data line 171 is applied to the source electrode 173.

The gate electrode 124, the semiconductor layer 154, the source electrode 173, and the drain electrode 175 form one thin film transistor. When the thin film transistor is turned on, the data signal applied to the source electrode 173 is transmitted to the drain electrode 175.

A passivation layer 180 is formed on the data line 171, the source electrode 173, the drain electrode 175, and the semiconductor layer 154 exposed between the source and drain electrodes 173 and 175. The passivation layer 180 may be made of an organic insulating material or an inorganic insulating material, and may be formed of a single layer or multiple layers.

A color filter 230 is formed in the liquid crystal driving region DR of each pixel area PX on the passivation layer 180. Each color filter 230 may display one of primary colors such as three primary colors of red, green, and blue. The color filter 230 is not limited to the three primary colors of red, green, and blue, but may display, for example, one of cyan, magenta, yellow, and white-based colors.

A light blocking member 220 is formed at a region between adjacent color filters 230. The light blocking member 220 is formed along the outer edge of the liquid crystal driving region DR and is positioned on the thin film transistor, thereby preventing light leakage. That is, the light blocking member 220 is formed at the first valley V1 and the second valley V2.

The color filter 230 and the light blocking member 220 are formed at the liquid crystal driving region DR and the outer edge of the liquid crystal driving region DR, and may be formed to overlap in some areas. The color filter 230 and the light blocking member 220 are not formed at the transparent region TR.

A first insulating layer 240 may be further formed on the color filter 230 and the light blocking member 220. The first insulating layer 240 may be made of the inorganic insulating material such as a silicon nitride (SiNx) and a silicon oxide (SiOx). The first insulating layer 240 has a function of protecting the color filter 230, made of the organic material, and the light blocking member 220, and may be omitted if necessary. As described above, the first insulating layer 240 may not be formed at the transparent region TR.

The first insulating layer 240, the light blocking member 220, and the passivation layer 180 have a contact hole 185 exposing a portion of the drain electrode 175. The contact hole 185 may be formed at the color filter 230 instead of the light blocking member 220.

A pixel electrode 191 connected to the drain electrode 175 through the contact hole 185 is formed on the first insulating layer 240. The pixel electrode 191 is formed inside the liquid crystal driving region DR of each pixel area PX, and is not formed in the transparent region TR. The pixel electrode 191 is connected to the drain electrode 175 such that it is applied with the data signal from the drain electrode 175 when the thin film transistor is turned on. The pixel electrode 191 may be formed of a transparent metal material such as, for example, indium-tin oxide (ITO) and indium-zinc oxide (IZO).

The pixel electrode 191 includes a transverse stem 193, a longitudinal stem 192 that is orthogonal to the transverse stem 193, and a plurality of first to fourth minute branches 194a, 194b, 194c, and 194d.

The transverse stem 193 may be formed in a direction parallel with the gate line 121, and the longitudinal stem 192 may be formed in a direction parallel with the data line 171. The transverse stem 193 may be formed substantially in the middle of the pixel area between two adjacent gate lines 121, and the longitudinal stem 192 may be formed substantially in the middle of the pixel area between two adjacent data lines 171.

One pixel area is divided into a first subpixel area, a second subpixel area, a third subpixel area, and a fourth subpixel area by the transverse stem 193 and the longitudinal stem 192. The first subpixel area is positioned at the left of the transverse stem 193 and the upper side of the longitudinal stem 192, and the second subpixel area is positioned at the right of the transverse stem 193 and the upper side of the longitudinal stem 192. The third subpixel area is positioned at the left of the transverse stem 193 and the lower side of the longitudinal stem 192, and the fourth subpixel area is positioned at the right of the transverse stem 193 and the lower side of the longitudinal stem 192.

The first minute branch 194a is formed in the first subpixel area, and the second minute branch 194b is formed in the second subpixel area. The third minute branch 194c is formed in the third subpixel area, and the fourth minute branch 194d is formed in the fourth subpixel area.

The first minute branch 194a extends obliquely in an upper left direction from the transverse stem 193 or the longitudinal stem 192, and the second minute branch 194b extends obliquely in an upper right direction from the transverse stem 193 or the longitudinal stem 192. Further, the third minute branch 194c extends obliquely in a lower left direction from the transverse stem 193 or the longitudinal stem 192, and the fourth minute branch 194d extends obliquely in a lower right direction from the transverse stem 193 or the longitudinal stem 192.

The first to fourth minute branches 194a to 194d may be formed so as to form an angle of substantially 45 degrees or 135 degrees with the gate line 121 or the transverse stem 193. Further, the first to fourth minute branches 194a to 194d of adjacent subpixel areas may be formed so as to be perpendicular to each other.

The shape of the pixel electrode 191 shown in FIG. 1 is described above, but is not limited thereto and may be variously modified. Further, one pixel area is divided into four subpixel areas, but may be divided into more than four areas, or may not be divided into a plurality of subpixel areas.

A common electrode 270 is formed on the pixel electrode 191 so as to be spaced apart from the pixel electrode 191 by a predetermined distance. The common electrode 270 is formed at the liquid crystal driving region DR and the second valley V2 positioned between liquid crystal driving regions DR and is connected in the row direction. The common electrode 270 is not formed at the transparent region TD.

A microcavity 305 is formed between the pixel electrode 191 and the common electrode 270. That is, the microcavity 305 is enclosed by the pixel electrode 191 and the common electrode 270. The microcavity 305 is positioned at the liquid crystal driving region DR. The width and area of the microcavity 200 may be variously changed according to size and resolution of the display device.

The common electrode 270 may be formed of the transparent metal material such as, for example, indium-tin oxide (ITO) and indium-zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the portion of the first insulating layer 240 which is not covered by the pixel electrode 191.

A second alignment layer 21 is formed below the common electrode 270 to face the first alignment layer 11.

The first alignment layer 11 and the second alignment layer 21 may be formed as vertical alignment layers, and may be made of alignment materials such as, for example, polyamic acid, polysiloxane, and polyimide. The first and second alignment layers 11 and 21 may be connected to each other at an edge of the pixel area PX.

A liquid crystal layer constituted by liquid crystal molecules 310 is formed in the microcavity 305 positioned between the pixel electrode 191 and the common electrode 270. The liquid crystal molecules 310 have negative dielectric anisotropy, and may be vertically aligned with respect to the substrate 110 while the electric field is not applied. That is, vertical alignment may be realized.

The pixel electrodes 191 to which the data voltage is applied generate an electric field together with the common electrode 270 to determine alignment directions of the liquid crystal molecules 310 positioned in the microcavity 305 between the electrodes 191 and 270. As such, the luminance of light that passes through the liquid crystal layer varies depending on the determined alignment directions of the liquid crystal molecules 310. The microcavity 305 is positioned at the liquid crystal driving region DR, and the liquid crystal molecules 310 positioned at the liquid crystal driving region DR are driven. The pixel electrode 191, the common electrode 270, and the liquid crystal layer are not formed in the transparent region TR such that the luminance of light that passes through the transparent region TR is constant. Also, even if a highest gray value is displayed in the liquid crystal driving region DR, the light is absorbed or scattered in a process of passing through the pixel electrode 191, the common electrode 270, and the liquid crystal layer, such that the luminance of the light that passes through the transparent region TR is relatively higher than that of light that passes through the liquid crystal driving region DR, even at the highest gray value. In this way, the pixel electrode 191, the common electrode 270, and the liquid crystal layer are not formed in the transparent region TR, thereby improving the transmittance and the appearance of the display device.

A second insulating layer 350 may be further formed on the common electrode 270. The second insulating layer 350 may be made of an inorganic insulting material such as, for example, a silicon nitride (SiNx) and a silicon oxide (SiOx), and a silicon oxynitride (SiOxNy) may be present or omitted as necessary.

A roof layer 360 is formed on the second insulating layer 350. The roof layer 360 may be made of an organic material. The microcavity 305 is formed below the roof layer 360, and the shape of the microcavity 305 may be maintained by hardening the roof layer 360 using a curing process. That is, the roof layer 360 is formed so as to be spaced apart from the pixel electrode 191 with the microcavity 305 therebetween.

The roof layer 360 is formed at the liquid crystal driving region DR and the second valley V2 that is positioned between liquid crystal driving regions DR and is connected in the row direction. The roof layer 360 is not formed at the transparent region TD. In the second valley V2, the microcavity 305 is not formed under the roof layer 360 and is formed so as to be attached to the substrate 110. Accordingly, the thickness of the roof layer 360 positioned at the second valley V2 may be thicker than the thickness of the roof layer 360 positioned at the liquid crystal driving region DR. An upper surface and both side surfaces of the microcavity 305 are covered by the roof layer 360.

An injection hole 307 exposing a part of the microcavity 305 is formed in the common electrode 270, the second insulating layer 350, and the roof layer 360. The injection hole 307 may be formed at the edge of the liquid crystal driving region DR. For example, it may be formed at the upper edge and the lower edge of the liquid crystal driving region DR. Because the microcavity 305 is exposed by the injection hole 307, an aligning agent or a liquid crystal material may be injected into the microcavity 305 through the injection hole 307.

A third insulating layer 370 may be further formed on the roof layer 360. The third insulating layer 370 may be made of an inorganic insulating material such as, for example, a silicon nitride (SiNx) and a silicon oxide (SiOx). The third insulating layer 370 may be formed to cover the upper surface and the side surface of the roof layer 360. The third insulating layer 370 has a function of protecting the roof layer 360 made of the organic material, and may be omitted if necessary.

An overcoat 390 may be formed on the third insulating layer 370. The overcoat 390 is formed so that it covers the injection hole 307 through which a part of the microcavity 305 is exposed to the outside. That is, the overcoat 390 may seal the microcavity 305 so that the liquid crystal molecules 310 inserted into the microcavity 305 are not discharged to the outside. Because the overcoat 390 contacts the liquid crystal molecules 310, the overcoat 390 may be made of a material that does not react with the liquid crystal molecules 310. For example, the overcoat 390 may be made of parylene and the like.

The overcoat 390 may be formed as a multilayer structure such as a double layer structure or a triple layer structure. The double layer structure is configured with two layers made of different materials. The triple layer structure is configured with three layers, in which materials of adjacent layers are different from each other. For example, the overcoat 390 may include a layer made of an organic insulating material and a layer made of an inorganic insulating material.

Polarizers 12 and 22 may be further formed on an upper surface and a lower surface of the display device. The polarizers may be configured with a first polarizer 12 formed under the substrate and a second polarizer 22 formed on the overcoat 390. The first polarizer 12 may be attached to the lower surface of the substrate 110 and the second polarizer 22 may be attached to the overcoat 390.

The transmissive axis of the first polarizer 12 and the transmissive axis of the second polarizer 22 may be disposed to be in parallel. For example, the transmissive axes of the first polarizer 12 and the second polarizer 22 may be disposed parallel to the gate line 121 or the data line 171. When light passes through the display device in a state in which the electric field is not initially formed, a normally white mode is realized.

In the display device according to an example embodiment, the pixel area PX includes the transparent region TR and the liquid crystal driving region DR. The pixel electrode 191, the common electrode 270, the roof layer 360, the liquid crystal layer, and the color filter 230 are formed at the liquid crystal driving region DR and are not formed at the transparent region TR. In FIG. 3, the gate insulating layer 140 and the overcoat 390 are formed on the substrate 110 in the transparent region TR, however the present disclosure is not limited thereto. By removing the gate insulating layer 140 and the overcoat 390 positioned at the transparent region TR through patterning, the transparency and the appearance may be further improved.

As a ratio of the area occupied by the transparent region TR to the pixel area PX is increased, the transparency and the appearance of the display device may be improved. However, the liquid crystal is not driven in the transparent region TR and the image is not displayed, such that the ratio of the transparent region TR may be appropriately selected by considering the resolution. For example, the area of the transparent region TR may be 10% to 50% of the pixel area PX.

Next, referring to FIG. 5, a display device according to another example embodiment will be described.

Figure 5:
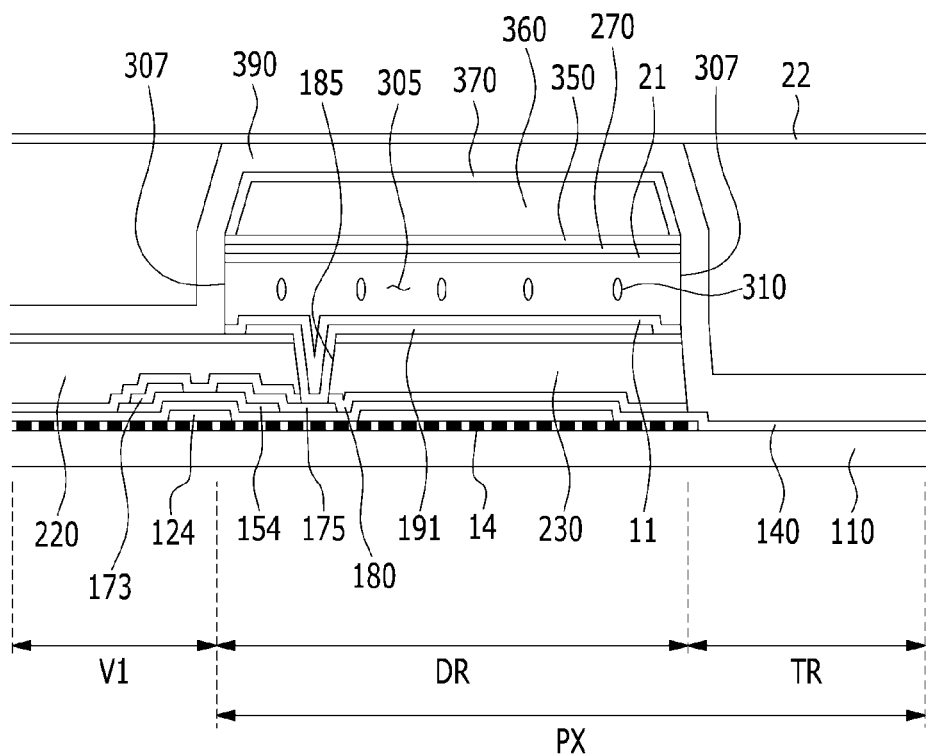
FIG. 5 is a partial cross-sectional view of a display device according to an example embodiment.

The display device according to the current example embodiment shown in FIG. 5 is the same as most of the display device according to the example embodiment shown in FIG. 1 to FIG. 4 such that the description thereof is omitted. However, in the present example embodiment, the first polarizer is not formed at the transparent region differently from the previous example embodiment, and this will be described in detail.

FIG. 5 is a cross-sectional view of a portion of a display device according to an example embodiment.

The substrate 110 of a display device according to an example embodiment includes a plurality of pixel areas PX having the transparent region TR and the liquid crystal driving region DR. The pixel electrode 191, the common electrode 270, the roof layer 360, the liquid crystal layer, the color filter 230, etc., are formed in the liquid crystal driving region DR, but are not formed in the transparent region TR.

Polarizers 14 and 22 are formed on the upper and lower surfaces of the display device. The polarizers 14 and 22 include a first polarizer 14 formed on the substrate 110 and a second polarizer 22 formed on the overcoat 390.

The transmissive axis of the first polarizer 14 and the transmissive axis of the second polarizer 22 may be disposed to be in parallel or to be crossed. For example, the transmissive axis of the first polarizer 14 may be disposed parallel to the gate line 121 and the transmissive axis of the second polarizer 22 may be disposed parallel to the data line 171. Thus, light does not pass through the display device in the state that the electric field is not initially formed, thereby realizing a normally black mode.

When the transmissive axis of the first polarizer 14 and the transmissive axis of the second polarizer 22 cross each other, if the first polarizer 14 and the second polarizer 22 exist in the transparent region TR, the light does not pass through the transparent region. When the transmissive axis of the first polarizer 14 and the transmissive axis of the second polarizer 22 are parallel to each other, the light may be partially absorbed in a process in which the light passes through the first polarizer 14 and the second polarizer 22.

In the present example embodiment, the first polarizer 14 is formed in the liquid crystal driving region DR, but is not formed in the transparent region TR such that the transmittance and the appearance of the display device may be further improved. In FIG. 5, the first polarizer 14 is formed in the first valley V1. The first polarizer 14 may or may not be formed in the first valley V1 and the second valley V2.

The first polarizer 14 may be a metal wire grid polarizer. The metal wire grid polarizer is an element that induces polarization by forming a fine pattern of a metal material on the substrate 110, and for example, may be formed by a nano-imprinting method. Accordingly, the first polarizer 14 may be formed in a predetermined region.

The second polarizer 22 is formed on the overcoat 390 by an attachment method, and may be disposed in both the liquid crystal driving region DR and the transparent region TR.

Next, referring to FIG. 6, a display device according to another example embodiment will be described.

Figure 6:
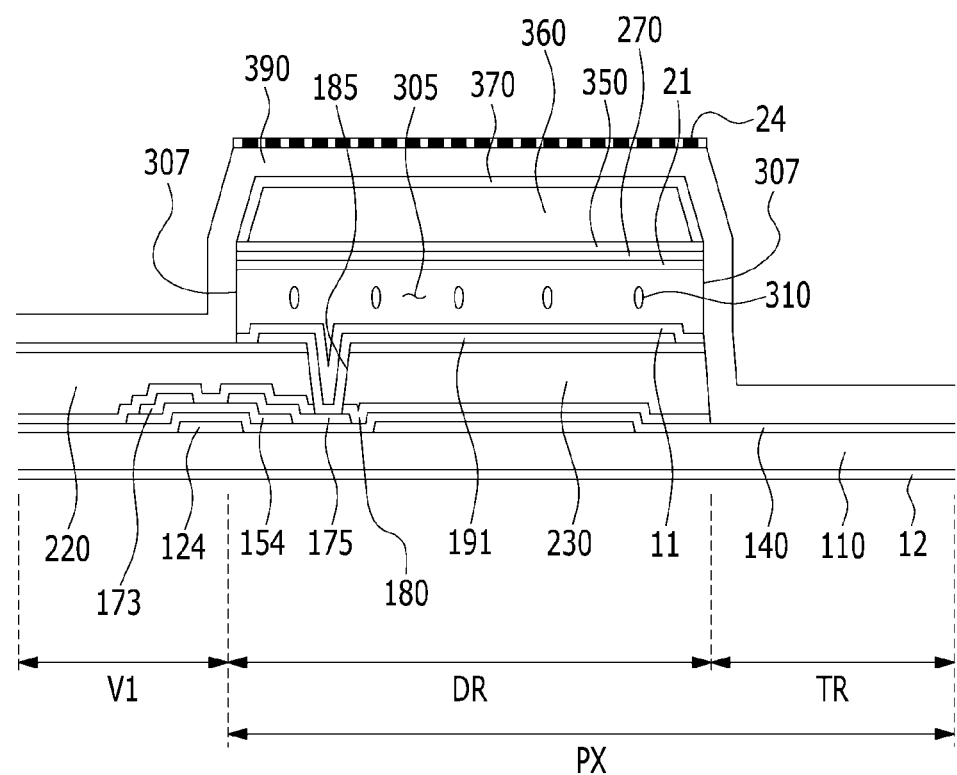
FIG. 6 is a partial cross-sectional view of a display device according to an example embodiment.

The display device according to the current example embodiment shown in FIG. 6 is the same as most of the display device according to the example embodiment shown in FIG. 1 to FIG. 4 such that the description thereof is omitted. In the present example embodiment, the second polarizer is not formed in the transparent region, differently from the previous example embodiments, and this will be described in detail.

FIG. 6 is a partial cross-sectional view of a display device according to an example embodiment.

Polarizers 12 and 24 may be further formed on an upper surface and a lower surface of the display device. The polarizers may be configured by a first polarizer 12 formed under the substrate and a second polarizer 24 formed on the overcoat 390.

The transmissive axis of the first polarizer 12 and the transmissive axis of the second polarizer 22 may be disposed to be in parallel or to be crossed.

In the present example embodiment, the second polarizer 24 is formed in the liquid crystal driving region DR, but is not formed in the transparent region TR such that the transmittance and the appearance of the display device may be further improved. In FIG. 6, the second polarizer 24 is not formed in the first valley V1. The second polarizer 24 may or may not be formed in the first valley V1 and the second valley V2.

The second polarizer 24 may be made of the metal wire grid polarizer.

The first polarizer 12 is formed under the substrate 110 by the attachment method, and may be formed in both the liquid crystal driving region DR and the transparent region TR.

Next, referring to FIG. 7, a display device according to another example embodiment will be described.

Figure 7:
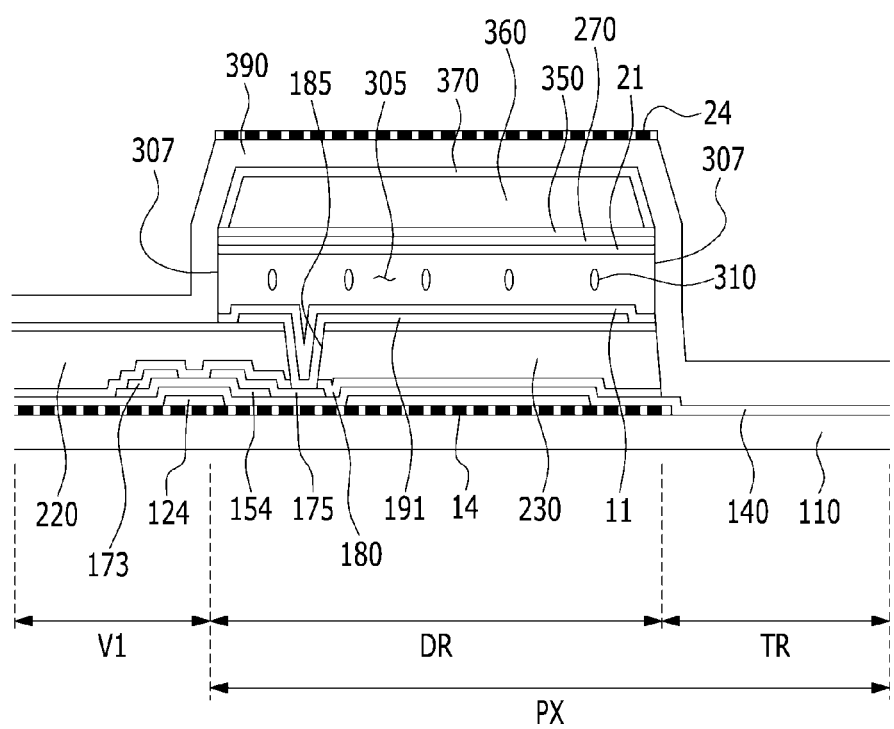
FIG. 7 is a partial cross-sectional view of a display device according to an example embodiment.

The display device according to the current example embodiment shown in FIG. 7 is the same as most of the display device according to the example embodiment shown in FIG. 1 to FIG. 4 such that the description thereof is omitted. In the present example embodiment, the first polarizer and the second polarizer are not formed in the transparent region, differently from the previous example embodiment, and this will be described in detail.

FIG. 7 is a partial cross-sectional view of a display device according to an example embodiment.

The polarizers 14 and 24 may be further formed on the upper surface and the lower surface of the display device. The polarizers may include the first polarizer 14 formed on the substrate 110 and the second polarizer 24 formed on the overcoat 390.

The transmissive axis of the first polarizer 14 and the transmissive axis of the second polarizer 24 may be disposed to be in parallel or to be crossed.

In the present example embodiment, the first polarizer 14 and the second polarizer 24 are formed in the liquid crystal driving region DR and are not formed in the transparent region TR such that the transmittance and the appearance of the display device may be further improved. In FIG. 7, the first polarizer 14 is formed in the first valley V1 and the second polarizer 24 is not formed in the first valley V1. The first polarizer 14 and the second polarizer 24 may or may not be formed in the first valley V1 and the second valley V2.

The first polarizer 14 and the second polarizer 24 may be metal wire grid polarizers.

Next, referring to FIG. 8, a display device according to another example embodiment will be described.

Figure 8:
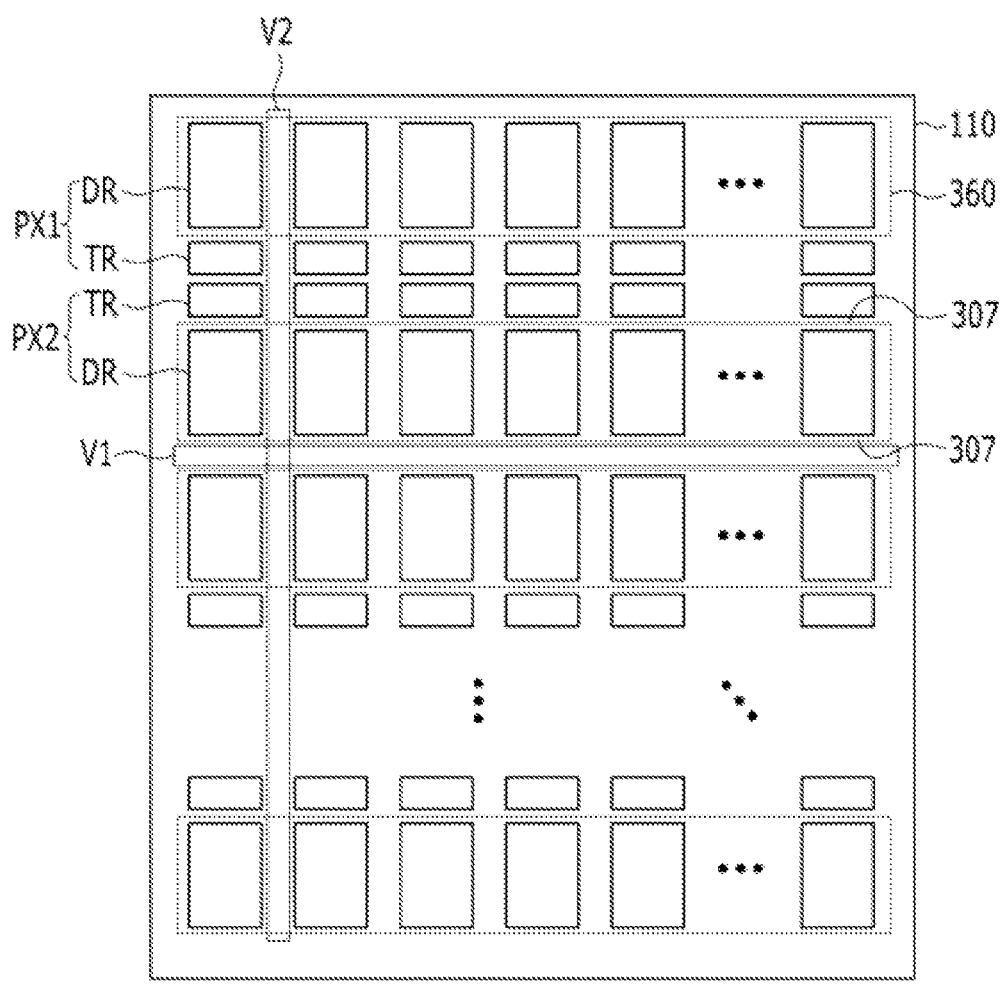
FIG. 8 is a top plan view of a display device according to an example embodiment.

The display device according to the current example embodiment shown in FIG. 8 is the same as most of the display device according to the example embodiment shown in FIG. 1 to FIG. 4 such that the description thereof is omitted. In the present example embodiment, the transparent regions are disposed to be adjacent to each other in the pixel areas adjacent in the column direction differently from the previous example embodiment, and this will be described in detail.

FIG. 8 is a top plan view of a display device according to an example embodiment, and for convenience, FIG. 8 only shows some constituent elements.

The substrate 110 includes a plurality of pixel areas PX1, PX2. The plurality of pixel areas PX1, PX2 are disposed in a matrix shape including a plurality of pixel rows and a plurality of pixel columns. Each pixel area PX1, PX2 may include the transparent region TR and the liquid crystal driving region DR. The transparent region TR and the liquid crystal driving region DR are disposed to be adjacent to each other in the column direction.

In the pixel areas PX1, PX2 adjacent to each other in the column direction, the transparent regions TR are disposed to be adjacent to each other. For example, in the pixel area PX1 of an odd-numbered row, the liquid crystal driving region DR may be disposed at an upper side and the transparent region TR may be disposed at a lower side. Also, in the pixel area PX2 of an even-numbered row, the transparent region TR may be disposed at the upper side and the liquid crystal driving region DR may be disposed at the lower side. In contrast, in the pixel area PX1 of the odd-numbered row, the transparent region TR may be disposed at the upper side and the liquid crystal driving region DR may be disposed at the lower side, while in the pixel area PX2 of the even-numbered row, the liquid crystal driving region DR may be disposed at the upper side and the transparent region TR may be disposed at the lower side.

In the pixel areas PX1, PX2 adjacent in the column direction, the liquid crystal driving regions DR are disposed to be adjacent to each other. For example, in the case of the pixel area PX1 of the first row and the pixel area PX2 of the second row, the transparent regions TR are adjacent, while in the case of the pixel area PX2 of the second row and the pixel area PX1 of the third row, the liquid crystal driving regions DR are adjacent.

The transparent regions TR are adjacent in the pixel areas PX1, PX2 adjacent in the column direction such that the size of the transparent region TR is further largely recognized compared with the case that the transparent regions TR are not adjacent. This is because two transparent regions TR that are adjacent up and down are recognized as one transparent region IR. Accordingly, the number of transparent regions TR may be reduced and a width thereof may be widened, thereby further improving the transparency and the appearance.

In the present example embodiment, the first valley V1 may be between the adjacent liquid crystal driving regions DR. For example, the first valley V1 may be between the liquid crystal driving region DR of the pixel area PX2 of the second row and the liquid crystal driving region DR of the pixel area PX1 of the third row.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

<Description of Symbols>

| | |
|---|---|
| 11: first alignment layer | 12, 14: first polarizer |
| 21: second alignment layer | 22, 24: second polarizer |
| 110: substrate | 121: gate line |
| 124: gate electrode | 133: storage electrode |
| 140: gate insulating layer | 154: semiconductor layer |
| 171: data line | 173: source electrode |
| 175: drain electrode | 180: passivation layer |
| 185: contact hole | 191: pixel electrode |
| 220: light blocking member | 230: color filter |
| 140: first insulating layer | 270: common electrode |
| 305: microcavity | 307: injection hole |
| 310: liquid crystal molecule | 350: second insulating layer |
| 360: roof layer | 370: third insulating layer |
| 390: overcoat | |

What is claimed is:

1. A display device comprising:
   a substrate including a plurality of pixel areas having a transparent region and a liquid crystal driving region;
   a first polarizer disposed on the substrate;
   a thin film transistor disposed on the substrate;
   a pixel electrode connected to the thin film transistor;
   a common electrode disposed in the liquid crystal driving region on the pixel electrode so as to be spaced apart from the pixel electrode with a microcavity therebetween;
   a roof layer disposed on the common electrode such that the common electrode and the pixel electrode are on the same side of the roof layer;
   a liquid crystal layer disposed in the microcavity; and
   an overcoat disposed on the roof layer to seal the microcavity, wherein the first polarizer, the pixel electrode, the common electrode, the roof layer, and the liquid crystal layer are disposed in the liquid crystal driving region, and wherein the first polarizer, the pixel electrode, the common electrode, the roof layer, and the liquid crystal layer are not disposed in the transparent region.

2. The display device of claim 1, further comprising a color filter disposed in the liquid crystal driving region.

3. The display device of claim 2, further comprising a light blocking member disposed along an outer edge of the liquid crystal driving region.

4. The display device of claim 3, wherein the color filter and the light blocking member are not disposed in the transparent region.

5. The display device of claim 1, wherein the transparent region is disposed at 10% to 50% of the pixel area.

6. The display device of claim 1, further comprising: a second polarizer disposed on the overcoat.

7. The display device of claim 6, wherein the transmissive axis of the first polarizer and the transmissive axis of the second polarizer are parallel.

8. The display device of claim 6, wherein the transmissive axis of the first polarizer and the transmissive axis of the second polarizer are crossed.

9. The display device of claim 1, wherein the first polarizer is a metal wire grid polarizer.

10. The display device of claim 6, wherein the second polarizer is a metal wire grid polarizer.

11. The display device of claim 6, wherein the second polarizer is disposed in the liquid crystal driving region, and the second polarizer is not disposed in the transparent region.

12. The display device of claim 1, wherein:
a plurality of pixel areas are disposed in a matrix shape; and
the transparent region and the liquid crystal driving region are disposed to be adjacent in a column direction.

13. The display device of claim 12, wherein the transparent regions of pixel areas adjacent in a column direction are disposed to be adjacent.

14. The display device of claim 13, wherein:
the liquid crystal driving region is disposed at an upper side and the transparent region is disposed at a lower side in a pixel area of an odd-numbered row; and
the transparent region is disposed at the upper side and the liquid crystal driving region is disposed at the lower side in a pixel area of an even-numbered row.

15. The display device of claim 1, further including a plurality of gate lines and a plurality of data lines that cross the gate lines, wherein the pixel area is defined as a region between two adjacent gate lines and two adjacent data lines.

16. A display device comprising:
a substrate including a plurality of pixel areas having a transparent region and a liquid crystal driving region;
a first polarizer disposed on the substrate;
a thin film transistor disposed on the substrate;
a pixel electrode connected to the thin film transistor;
a common electrode disposed in the liquid crystal driving region on the pixel electrode so as to be spaced apart from the pixel electrode with a microcavity therebetween;
a roof layer disposed on the common electrode;
a liquid crystal layer disposed in the microcavity;
an overcoat disposed on the roof layer so as to seal the microcavity and
a second polarizer disposed on the overcoat,
wherein the pixel electrode, the common electrode, the roof layer, the liquid crystal layer, and the second polarizer are disposed in the liquid crystal driving region, and
wherein the pixel electrode, the common electrode, the roof layer, the liquid crystal layer, and the second polarizer are not disposed in the transparent region.

17. The display device of claim 16, wherein the first polarizer is disposed in the liquid crystal driving region and the transparent region.

18. The display device of claim 16, wherein the second polarizer is a metal wire grid polarizer.

* * * * *